United States Patent
Lin et al.

(10) Patent No.: US 7,768,771 B2
(45) Date of Patent: Aug. 3, 2010

(54) SUPERCAPACITOR STRUCTURE AND METHOD FOR MANUFACTURING THE SAME

(75) Inventors: Wen-Ting Lin, Caotun Townhip (TW); Hung-Chang Chen, Tu-Chen (TW); Hsaio-Kuan Tsai, Tu-Chen (TW)

(73) Assignee: Taiwan Textile Research Institute, Taipei Hsien (TW)

( * ) Notice: Subject to any disclaimer, the term of this patent is extended or adjusted under 35 U.S.C. 154(b) by 469 days.

(21) Appl. No.: 11/957,657

(22) Filed: Dec. 17, 2007

(65) Prior Publication Data

US 2009/0009929 A1    Jan. 8, 2009

(30) Foreign Application Priority Data

Jul. 4, 2007    (TW) ............... 96124351 A

(51) Int. Cl.
*H01G 9/00*    (2006.01)

(52) U.S. Cl. .................. 361/502; 361/503; 361/504; 361/508; 361/512; 361/523

(58) Field of Classification Search .......... 361/502, 361/503–504, 508–512, 303–305, 306.1, 361/306.3, 516–519
See application file for complete search history.

(56) References Cited

U.S. PATENT DOCUMENTS

| | | | | |
|---|---|---|---|---|
| 5,260,855 A | * | 11/1993 | Kaschmitter et al. | 361/502 |
| 5,949,637 A | * | 9/1999 | Iwaida et al. | 361/502 |
| 6,491,789 B2 | * | 12/2002 | Niu | 162/145 |
| 6,643,119 B2 | * | 11/2003 | Nanjundiah et al. | 361/502 |
| 6,813,139 B2 | * | 11/2004 | Bendale et al. | 361/502 |
| 6,906,911 B2 | * | 6/2005 | Ikeda et al. | 361/502 |

* cited by examiner

*Primary Examiner*—Nguyen T Ha
(74) *Attorney, Agent, or Firm*—Occhiuti Rohlicek & Tsao LLP

(57) ABSTRACT

A laminate electrode of a bendable supercapacitor has a carbon fabric element and an electrically conductive current collector element secured by staple-shaped metallic fasteners or metallic wires so as to prevent two elements from being taken apart when the laminate electrode is bent.

20 Claims, 2 Drawing Sheets

SUPERCAPACITOR STRUCTURE AND METHOD FOR MANUFACTURING THE SAME

RELATED APPLICATIONS

This application claims priority to Taiwan Application Serial Number 96124351, filed Jul. 4, 2007, which is herein incorporated by reference.

BACKGROUND

1. Field of Invention

The present invention relates to a capacitor structure and a manufacturing method thereof.

2. Description of Related Art

Conventional supercapacitors are usually manufactured as coin-shaped or cylinder-shaped capacitors. In order to make an internal electrical resistance of a laminate electrode as low as possible, a high pressure is applied to press the laminate electrode as thin as possible. Because of this conventional method for manufacturing supercapacitors, electrode materials and package method are limited and the capacitor cannot be flexible or bendable.

SUMMARY

According to one embodiment of the present invention, a supercapacitor structure includes a bendable positive electrode, a bendable negative electrode and a separator member disposed there between. Each bendable electrode includes a carbon fabric element and an electrically conductive current collector element, which are closely bonded with a plurality of staple-shaped electrically conductive fastener penetrating through the carbon fabric element and the electrically conductive current collector element.

In another embodiment, a supercapacitor structure includes a bendable positive electrode, a bendable negative electrode and a separator member disposed therebetween. Each bendable electrode includes a carbon fabric element and an electrically conductive current collector element, which are sewed with at least one metallic wire penetrating through the carbon fabric element and the electrically conductive current collector element.

In still another embodiment, a method for manufacturing a supercapacitor structure is provided. A carbon fabric element and an electrically conductive current collector element are stacked. At least one metallic fastener is used to penetrate through the carbon fabric element and the electrically conductive current collector element so as to form a unitary bendable positive electrode or a unitary bendable negative electrode. A separator member is disposed between the unitary bendable positive electrode and the unitary bendable negative electrode. A flexible bag is used to package the bendable positive electrode, the bendable negative electrode and the separator member disposed therebetween. An electrolyte solution is filled into the flexible bag. Gas is removed from the flexible bag and the flexible bag is sealed.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
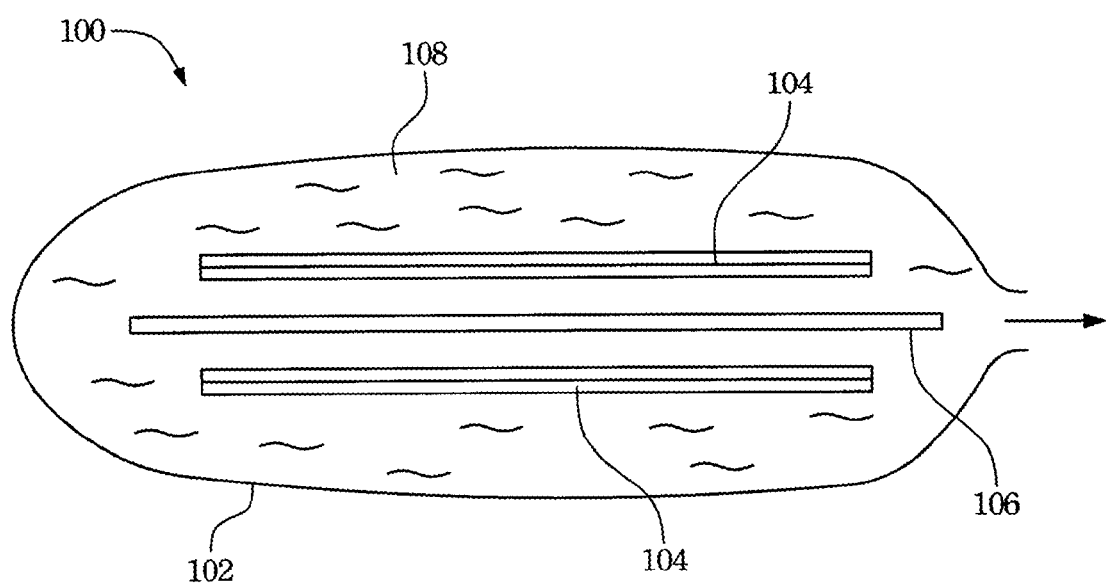
FIG. 1 illustrates a cross-sectional view of a bendable supercapacitor as described in an embodiment herein.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a cross-sectional view of a bendable supercapacitor as described in an embodiment herein. The bendable supercapacitor 100 includes a flexible bag 102, which packages two bendable laminate electrode 104 (a positive one and a negative one) and a separator member 106 disposed therebetween. An electrolyte solution 108 is also filled into the flexible bag 102. After ingredients of the supercapacitor 100 are well prepared, gas inside the flexible bag 102 is removed so as to maintain the supercapacitor 100 as thin as possible. The flexible bag 102 is then sealed and the bendable supercapacitor 100 can be easily adaptable to clothes, bags or other portable as a power supply source.

Figure 2:
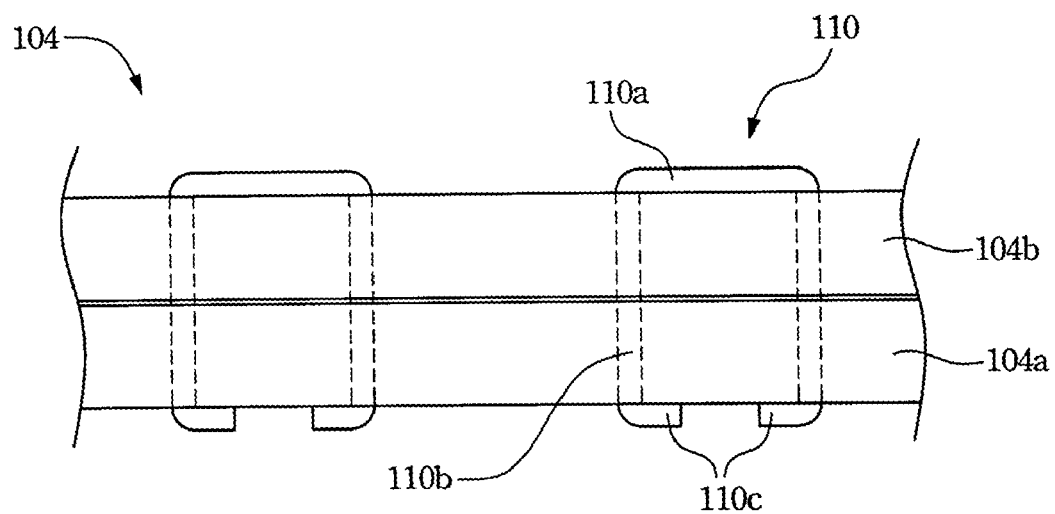
FIG. 2 illustrates a cross-sectional view of a bendable laminate electrode as described in an embodiment herein.

FIG. 2 illustrates a cross-sectional view of a bendable laminate electrode as described in an embodiment herein. In order to make the laminate electrode 104 to be a flexible and bendable one, staple-shaped electrically conductive fasteners 110 are used to secure a carbon fabric element 104a and an electrically conductive current collector element 104b. After the carbon fabric element 104a and the electrically conductive current collector element 104b are stacked, staple-shaped electrically conductive fasteners 110 penetrate through both elements (104a/104b) and two ends of the fasteners 110 are bent inwards and flattened to grip both elements (104a/104b) firmly. The laminate electrode 104 is densely and uniformly fastened with the fasteners 110 such that the laminate electrode 104 can be bent without the carbon fabric element 104a and the electrically conductive current collector element 104b being taken apart from each other. Parts of staple-shaped electrically conductive fasteners 110, which are exposed from the laminate electrode 104, can be substantially in contact with outer (or exposed) surfaces of the laminate electrode 104 to prevent from arcing, i.e. electric discharging between the laminate electrode 104 and the ends of the fasteners 110. For example, an exposed section 110a can be substantially in contact with outer (or exposed) surfaces of the electrically conductive current collector element 104b. Similarly, exposed sections 110c can be substantially in contact with outer (or exposed) surfaces of the carbon fabric element 104a. In addition to securing the carbon fabric element 104a and the electrically conductive current collector element 104b, the fasteners 110 also reduce electrical resistance between two elements (104a/104b). The electrically conductive fasteners 110 penetrate through the carbon fabric element 104a and the electrically conductive current collector element 104b to serve as conductors (a section 110b of the fastener 110) between two elements (104a/104b), the electrical resistance therebetween is thus lowered. In this embodiment, the electrically conductive current collector element 104b can be a metallic open-mesh grid or foil, which is made from nickel, copper, aluminum or titanium materials.

Figure 3:
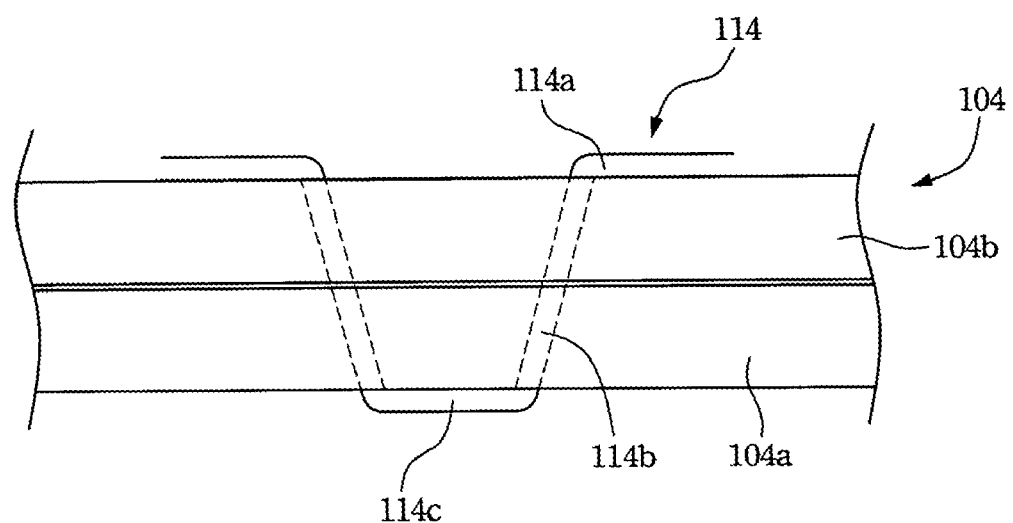
FIG. 3 illustrates a cross-sectional view of another bendable laminate electrode as described in another embodiment herein.

FIG. 3 illustrates a cross-sectional view of another bendable laminate electrode as described in another embodiment herein. In order to make the laminate electrode 104 to be a flexible and bendable one, a flexible metallic wire 114 is used to secure a carbon fabric element 104a and an electrically conductive current collector element 104b. After the carbon fabric element 104a and the electrically conductive current collector element 104b are stacked, the flexible metallic wire 114 is led, i.e. by a needle, to penetrate through both elements (104a/104b) and used to sew both elements (104a/104b) together. The laminate electrode 104 is densely and uniformly sewed with the flexible metallic wire 114 such that the laminate electrode 104 can be bent without the carbon fabric element 104a and the electrically conductive current collector element 104b being taken apart from each other. Parts of the flexible metallic wire 114, which are exposed from the laminate electrode 104, can be substantially in contact with outer (or exposed) surfaces of the laminate electrode 104 to prevent from arcing. For example, an exposed section 114a can be substantially in contact with outer (or exposed) surfaces of the electrically conductive current collector element 104b. Similarly, an exposed section 114c can be substantially in contact with outer (or exposed) surfaces of the carbon fabric element 104a. In addition to securing the carbon fabric element 104a and the electrically conductive current collector element 104b, the flexible metallic wire 114 also reduce electrical resistance between two elements (104a/104b). The electrically conductive metallic wire 114 penetrate through the carbon fabric element 104a and the electrically conductive current collector element 104b to serve as conductors (such as section 114b of the metallic wire 114) between two elements (104a/104b), the electrical resistance therebetween is thus lowered. In this embodiment, the electrically conductive current collector element 104b can be a metallic open-mesh grid or foil, which is made from nickel, copper, aluminum or titanium materials. In this embodiment, the metallic wire 114 can be gold, silver or copper wire.

In addition to embodiments illustrated in FIG. 2 and FIG. 3, the laminate electrode 104 can be secured or bonded with metallic fasteners other than staple-shaped metallic fasteners or metallic wires. An experimented laminate electrode 104 (14×17 mm$^2$; 203 F), which is manufactured with the design as illustrated in FIG. 2 and FIG. 3, has an internal electrical resistance as low as 0.02 ohms, which has achieved the commercialized standard.

The laminate electrode 104 as illustrated in FIG. 2 and FIG. 3 (including the carbon fabric element 104a and the electrically conductive current collector element 104b) only serves an example. Extra elements can be stacked on either one of two elements (104a/104b) or between two elements (104a/104b).

According to discussed embodiments herein, a laminate electrode of a supercapacitor, which is bonded by staple-shaped metallic fasteners or metallic wires, can be bent without the carbon fabric element and the electrically conductive current collector element being taken apart from each other. Thus, the bendable or flexible supercapacitor can be easily adaptable to clothes, bags or other portable as a power supply source.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A supercapacitor structure, comprising:
   each of a bendable positive electrode and a bendable negative electrode comprising a carbon fabric element and an electrically conductive current collector element, which are closely bonded with a plurality of staple-shaped electrically conductive fasteners penetrating through the carbon fabric element and the electrically conductive current collector element; and
   a separator member disposed between the bendable positive electrode and the bendable negative electrode.

2. The supercapacitor structure of claim 1, further comprising a flexible bag to package the bendable positive electrode, the bendable negative electrode and the separator member disposed therebetween.

3. The supercapacitor structure of claim 2, further comprising an electrolyte solution packaged within the flexible bag.

4. The supercapacitor structure of claim 1, wherein the electrically conductive current collector element comprises a metallic foil or open-mesh grid.

5. The supercapacitor structure of claim 1, wherein the electrically conductive current collector element comprises nickel, copper, aluminum or titanium materials.

6. A supercapacitor structure, comprising:
   each of a bendable positive electrode and a bendable negative electrode comprising a carbon fabric element and an electrically conductive current collector element, which are sewed together with at least one metallic wire penetrating through the carbon fabric element and the electrically conductive current collector element; and
   a separator member disposed between the bendable positive electrode and the bendable negative electrode.

7. The supercapacitor structure of claim 6, further comprising a flexible bag to package the bendable positive electrode, the bendable negative electrode and the separator member disposed therebetween.

8. The supercapacitor structure of claim 7, further comprising an electrolyte solution packaged within the flexible bag.

9. The supercapacitor structure of claim 6, wherein the electrically conductive current collector element comprises a metallic open-mesh grid.

10. The supercapacitor structure of claim 6, wherein the electrically conductive current collector element comprises a metallic foil.

11. The supercapacitor structure of claim 6, wherein the electrically conductive current collector element comprises nickel, copper, aluminum or titanium materials.

12. The supercapacitor structure of claim 6, wherein the metallic wire is selected from the group consisting of gold, silver and copper materials.

13. A supercapacitor structure, comprising:
   each of a bendable positive electrode and a bendable negative electrode comprising a carbon fabric element and an electrically conductive current collector element, which are closely bonded with at least one metallic fastener penetrating through the carbon fabric element and the electrically conductive current collector element; and
   a separator member disposed between the bendable positive electrode and the bendable negative electrode.

14. The supercapacitor structure of claim 13, wherein the metallic fastener is a staple-shaped metallic fastener.

15. The supercapacitor structure of claim 13, wherein the metallic fastener is a metallic wire sewing the bendable positive electrode and the bendable negative electrode together.

16. The supercapacitor structure of claim 13, wherein the metallic fastener comprises a section exposed from the carbon fabric element or the electrically conductive current collector element, and the exposed section is substantially in contact with an exposed surface of the carbon fabric element or the electrically conductive current collector element.

17. A method for manufacturing a supercapacitor structure, comprising:

stacking a carbon fabric element and an electrically conductive current collector element, and using at least one metallic fastener to penetrate through the carbon fabric element and the electrically conductive current collector element so as to form a unitary bendable positive electrode or a unitary bendable negative electrode;

disposing a separator member between the bendable positive electrode and the bendable negative electrode;

using a flexible bag to package the unitary bendable positive electrode, the unitary bendable negative electrode and the separator member disposed therebetween and filling an electrolyte solution into the flexible bag; and removing gas from the flexible bag and sealing the flexible bag.

18. The supercapacitor structure of claim 17, wherein the metallic fastener is a staple-shaped metallic fastener.

19. The supercapacitor structure of claim 17, wherein the metallic fastener is a metallic wire sewing the bendable positive electrode and the bendable negative electrode together.

20. The supercapacitor structure of claim 17, wherein the metallic fastener comprises a section exposed from the carbon fabric element or the electrically conductive current collector element, and the exposed section is substantially in contact with an exposed surface of the carbon fabric element or the electrically conductive current collector element.

* * * * *